United States Patent [19]
Dellasala

[11] 3,835,874
[45] Sept. 17, 1974

[54] METHOD OF INTRODUCING LIQUID DOSES

[76] Inventor: Frank Dellasala, 1459 59th St., Brooklyn, N.Y. 11219

[22] Filed: June 9, 1970

[21] Appl. No.: 44,795

Related U.S. Application Data

[62] Division of Ser. No. 692,874, Dec. 22, 1967, Pat. No. 3,570,524.

[52] U.S. Cl. ................................. 137/15, 137/240
[51] Int. Cl. ............................................ F16k 51/00
[58] Field of Search .............. 137/1, 15, 209, 564.5, 137/205.5

[56] References Cited
UNITED STATES PATENTS

| | | | |
|---|---|---|---|
| 2,877,929 | 3/1959 | Ireland | 137/563 X |
| 2,957,484 | 10/1900 | Nordin | 137/205.5 X |
| 3,131,706 | 5/1964 | Harban | 137/563 X |
| 3,285,272 | 11/1966 | Messenger | 137/564.5 X |

*Primary Examiner*—Alan Cohan
*Attorney, Agent, or Firm*—George H. Mortimer

[57] ABSTRACT

Method of introducing accurately measured doses of liquid that may, if desired, be varied in size into a product in process of being manufactured by use of a measuring chamber that is filled with the liquid to a level corresponding to the predetermined dose and delivering the dose by superatmospheric pressure displacement. The method is preferably carried out by the use of apparatus which includes a measuring cylinder, a fluid-tight piston movable therein to selected heights to measure out a dose of selected variable size and means to force the liquid into a discharge line leading to the product being made by applying force to the piston in the direction of the opening into the discharge line. The method is particularly useful in dosing a slurry in which the solid particles are kept suspended by agitation before and during the dosing operations. A water flush of the apparatus after each dosing may also be carried out. The method can be used for dosing two or more products or batches of the same product by providing branch delivery lines connected with the delivery line from the measuring cylinder. The operation can be automated, manual or a combination of both.

4 Claims, 9 Drawing Figures

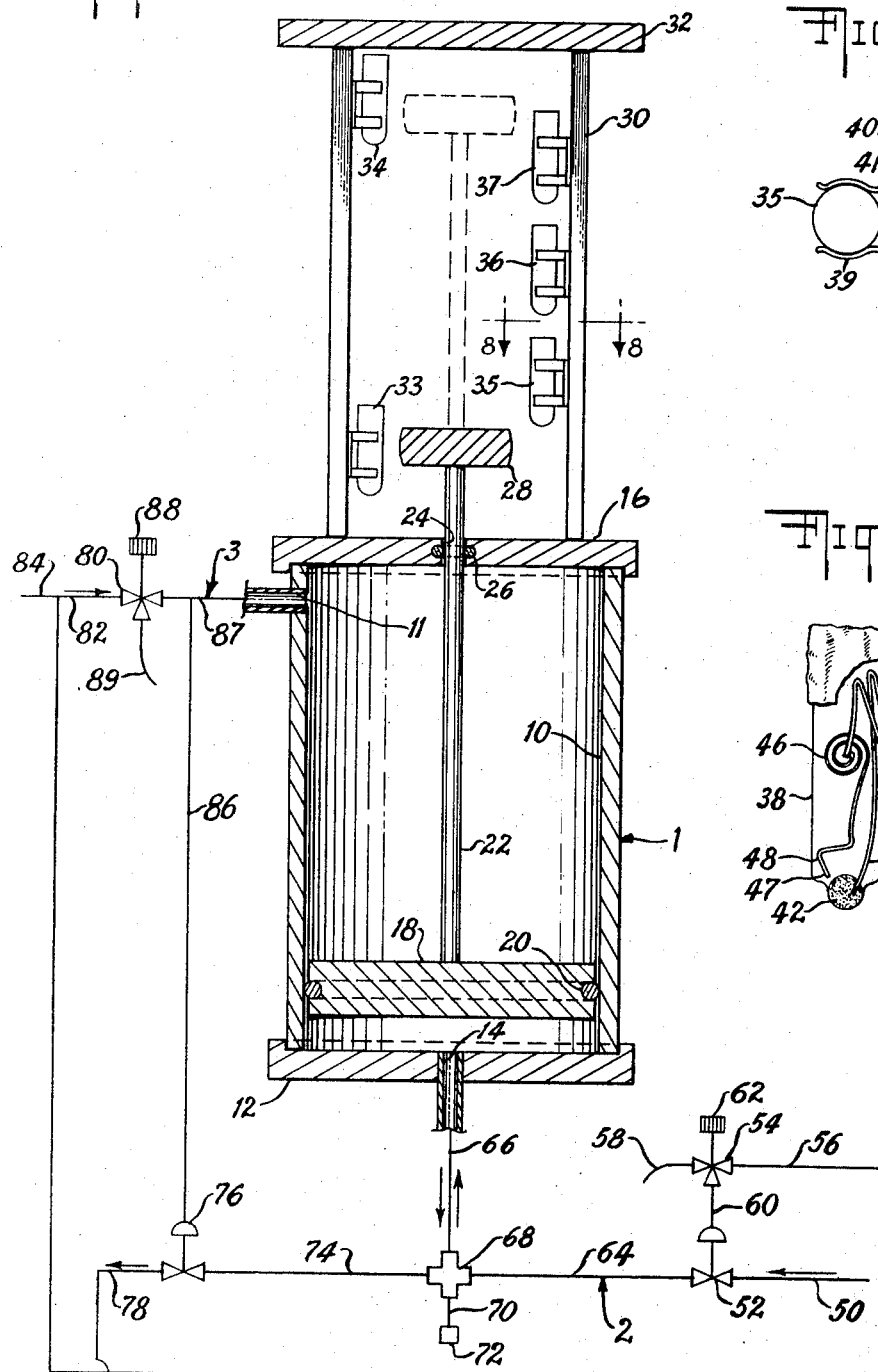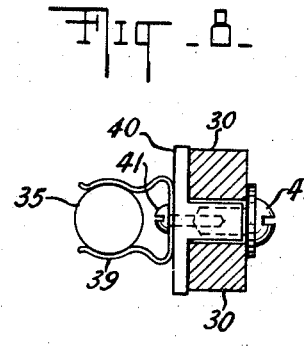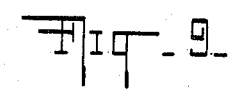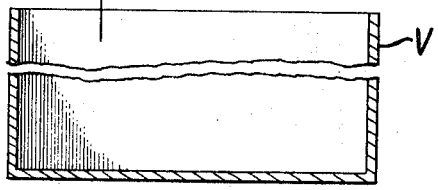
PATENTED SEP 17 1974
3,835,874
SHEET 1 OF 6
Fig. 1.
Fig. 8.
Fig. 9.
INVENTOR.
FRANK J. DELLASALA
BY

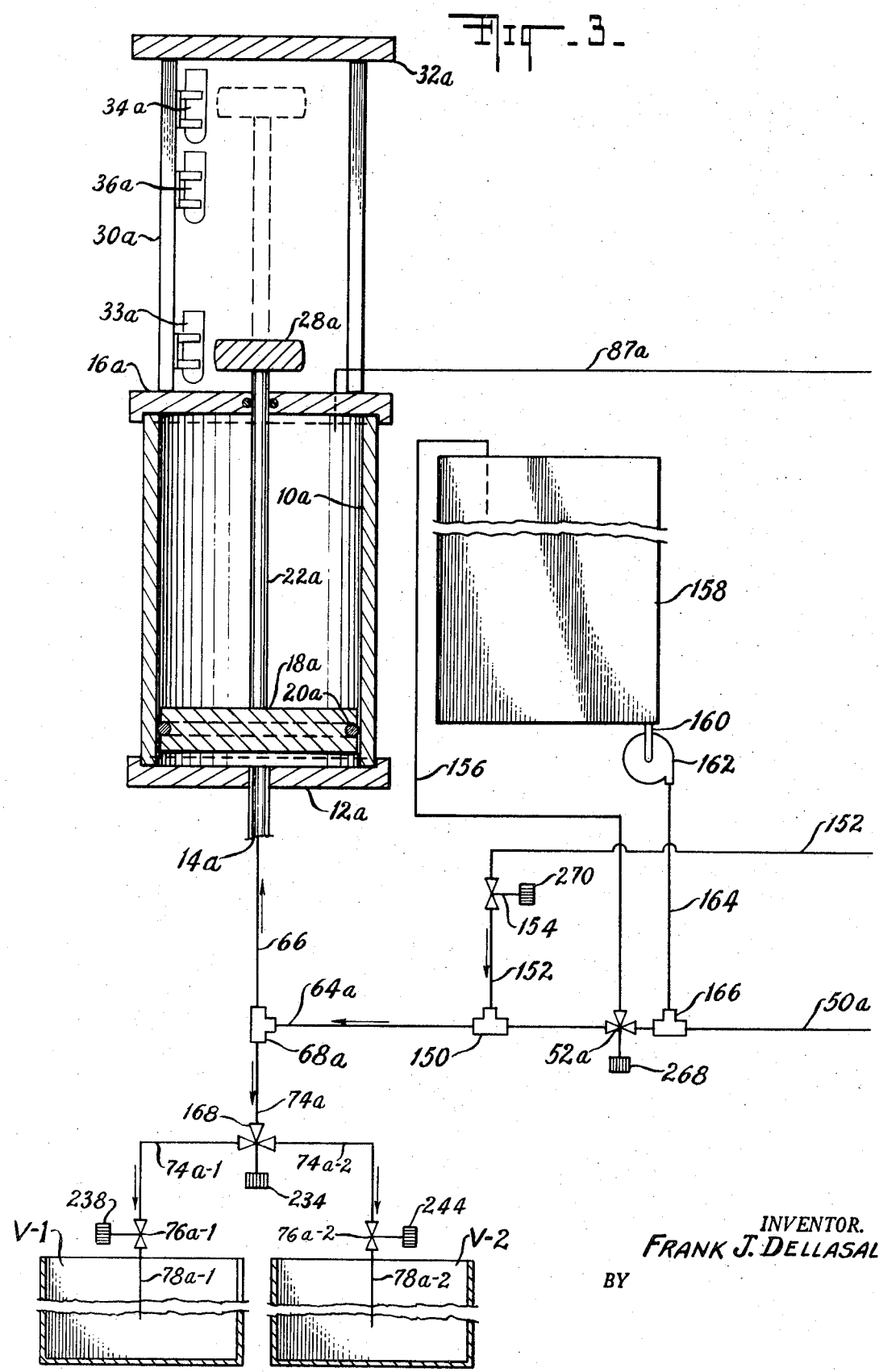

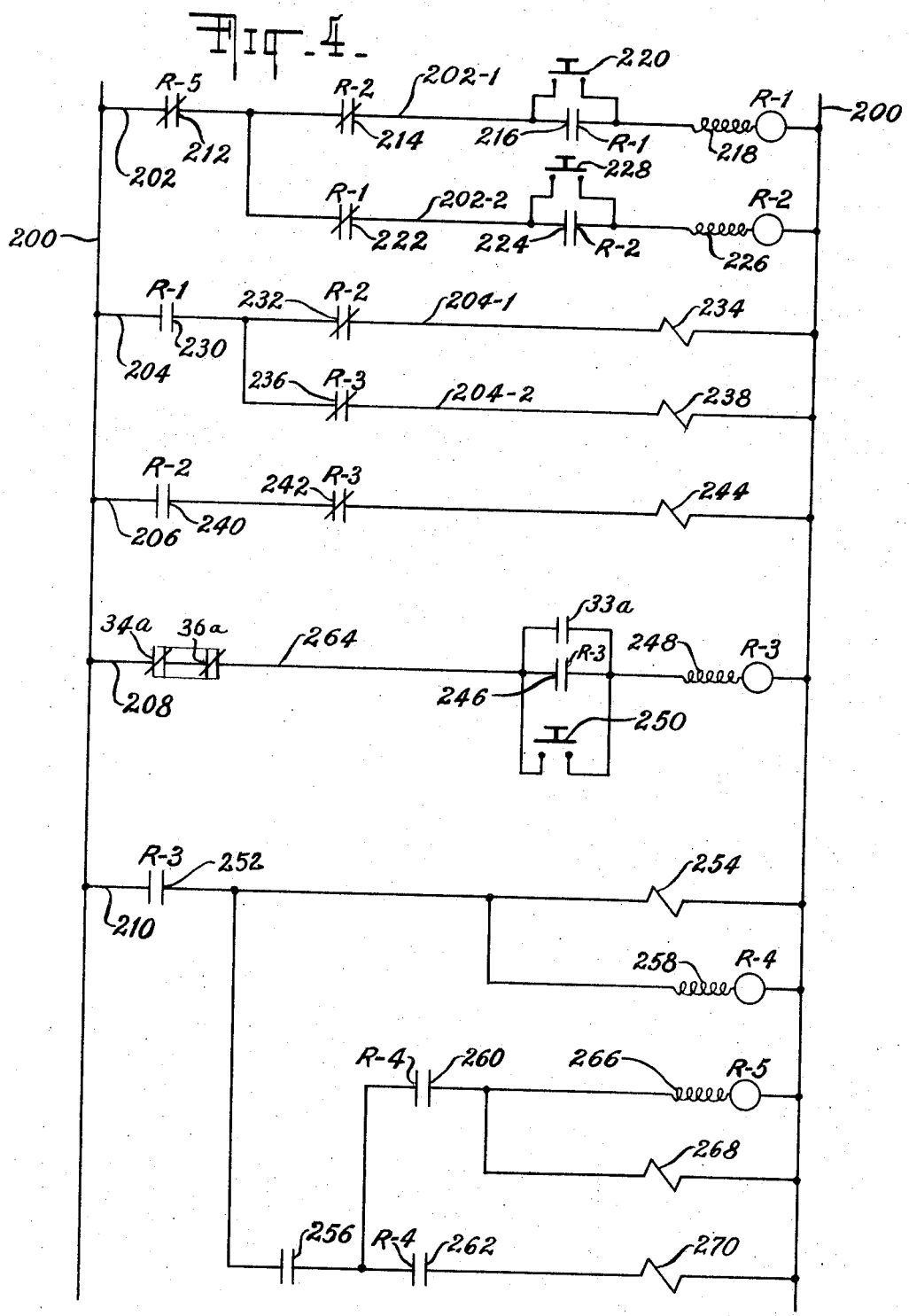

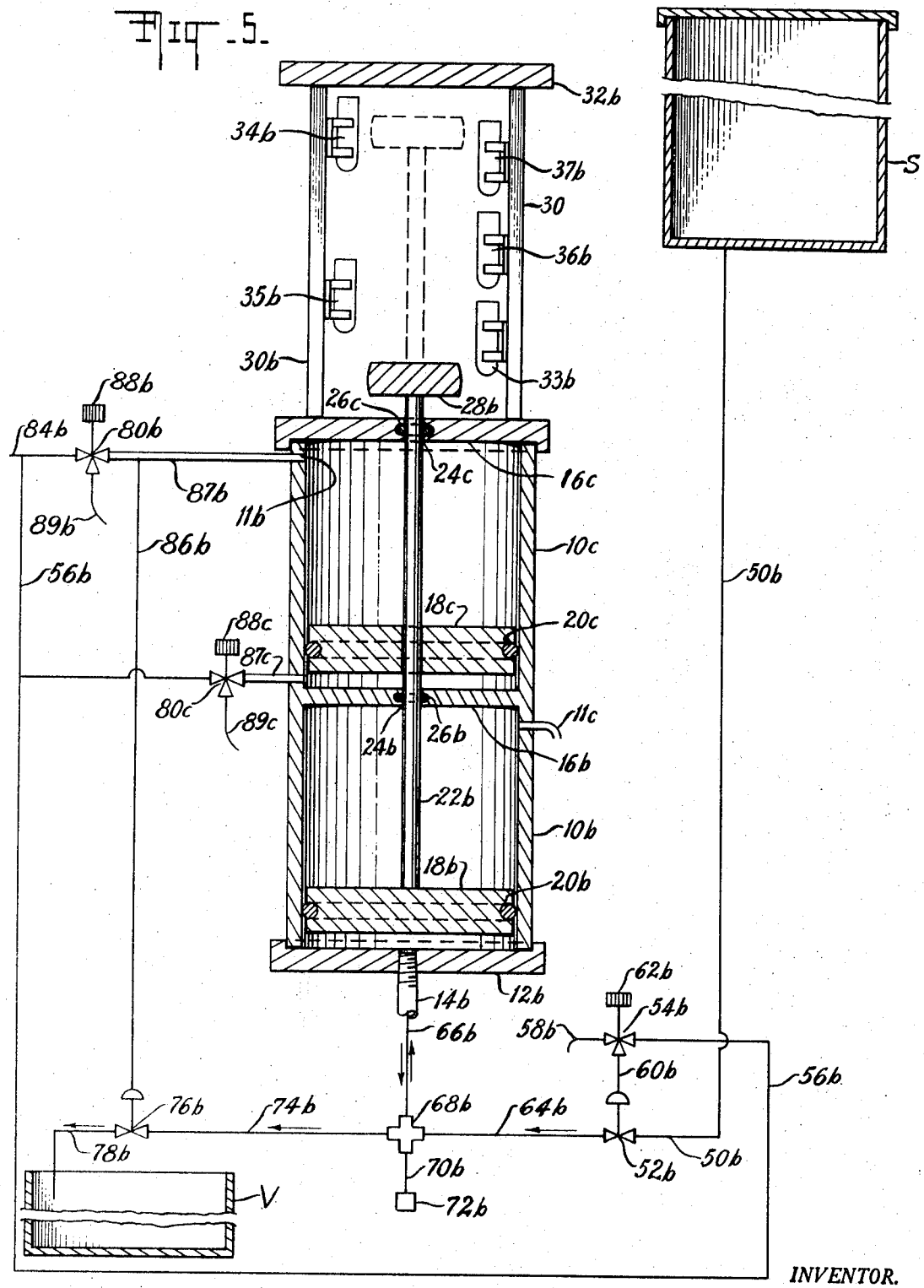

INVENTOR.
FRANK J. DELLASALA
BY

METHOD OF INTRODUCING LIQUID DOSES

This application is a division of my prior application Ser. No. 692,874, filed Dec. 22, 1967 for PISTON DOSER now U.S. Pat. No. 3,570,524 issued Mar. 16, 1971.

DESCRIPTION

The invention relates to a method of introducing accurately measured but variable quantities of liquids, especially slurries, into a product in process of being manufactured either by batch or continuous process.

In the manufacture of many products, it is necessary to introduce certain additives in accurately controlled proportions into the product in process of being manufactured, e.g., when it is a fluent mass of material being processed. An illustrative example of such a product is a household detergent composition comprising an organic detergent; inorganic and/or organic builders such as phosphates, silicates, carbonates, sulfates, ethylene diamine tetracetic acid salts, fatty acid alkylolamines and the like; and one or more optical bleaches. These bleaches are present in the final product in very small proportions, for example, a very small fraction of 1 percent, so that accurate measuring or proportioning of the bleach ingredient into the mixture of the remaining ingredients during processing is highly desirable. When the bleach ingredient is a slurry of solid particles suspended, for example, in water, it is necessary not only to measure out a succession of accurately predetermined volumes or doses of the slurry, but also to keep the particles uniformly suspended in the liquid carrier so that each successive measured quantity contains substantially the same proportion of solids. Since the same mixing equipment is ordinarily used for making products having different formulations, it is highly advantageous to be able to adjust the volume of the liquid measured in each cycle of operation.

The method of the present invention is designed to perform these and other operations which will be described in detail in conjunction with suitable apparatus for performing the method illustrated in the drawings in which:

FIG. 1 is a somewhat schematic vertical sectional view of one embodiment of the measuring device and some of the piping for the liquid to be measured and for the air which is used for the dual purpose of flow control and pressure discharge;

FIG. 3 is a view similar to FIG. 1 of a second embodiment of the measuring device;

FIG. 4 is a wiring diagram of the electrical system used with the measuring device of FIG. 3;

FIG. 5 is a view similar to FIG. 1 of a third embodiment of the measuring device with which the electrical system shown in FIG. 2 may also be used;

FIG. 8 is a cross-sectional view on the line 8—8 of FIG. 1; and

FIG. 9 is a side view of a mercury switch usable in the invention.

The method the present invention of introducing a predetermined dose of liquid, i.e., a dose of predetermined size, into a product in the process of being manufactured comprises measuring a predetermined quantity of liquid, e.g., by filling a measuring chamber with a liquid to a level corresponding to the predetermined dose, and then utilizing superatmospheric pressure to displace the liquid from the measuring chamber into the product in process of being manufactured. In many cases the liquid to be measured and incorporated into the product in process of being manufactured is a slurry of solid particles that will settle. In the method of the invention this settling is practically prevented by agitating the liquid before segregating the measured quantity so that the slurry is substantially uniform at the time the measured quantity is segregated from a larger mass and, preferably, the liquid is also agitated after segregation, e.g., while it is in the measuring chamber. Where the liquid being measured and dosed into the product being manufactured is a slurry, the method also preferably includes the step of washing out the apparatus being used for measuring and dosing so as to prevent a build-up of settled solids in the system.

Any suitable apparatus may be used for carrying out the process of the invention and a number of preferred embodiments are the subject of the above identified prior application. The disclosure and drawings are incorporated herein as illustrations of preferred forms of apparatus for use in carrying out the method of this invention.

Figure 2:
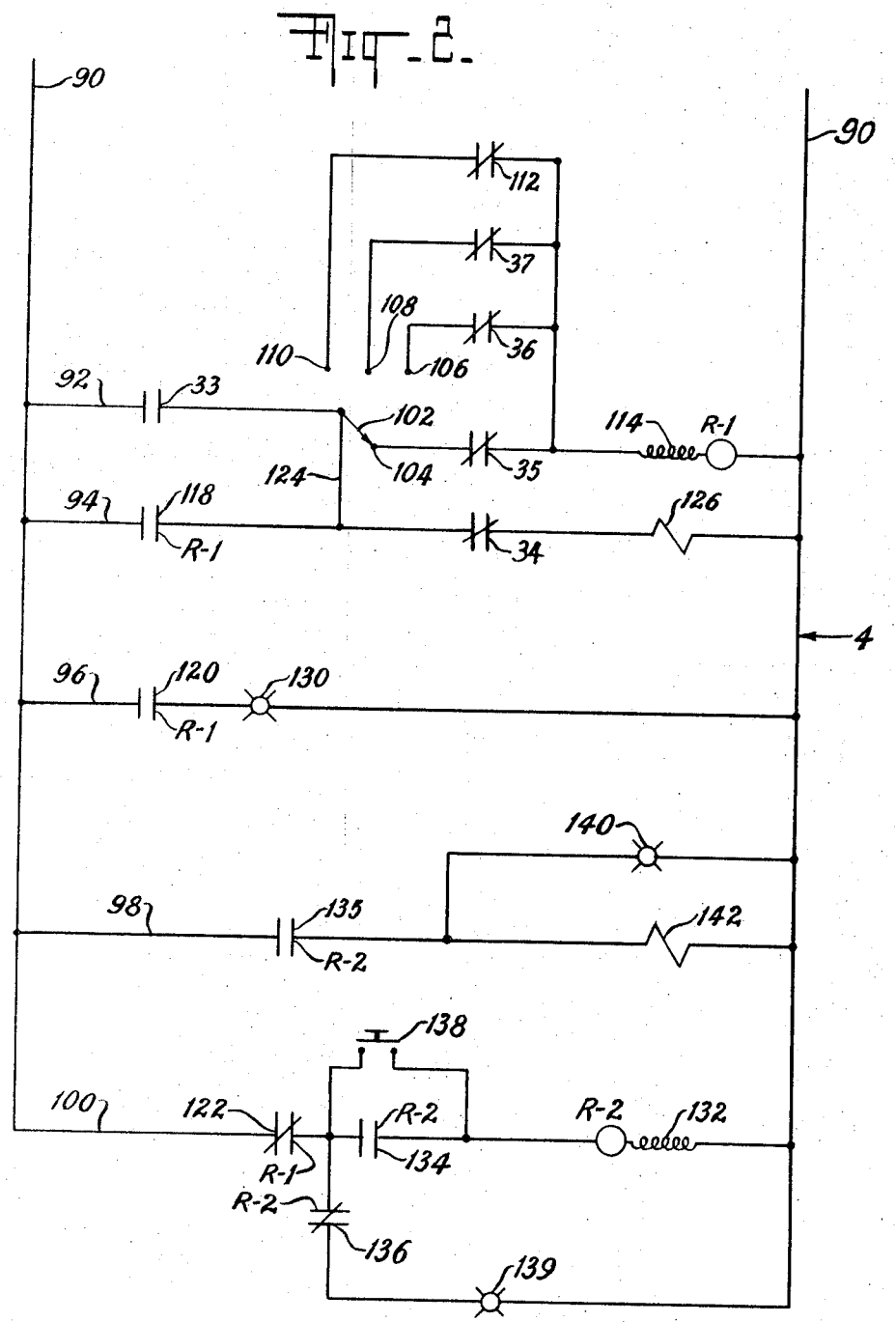
FIG. 2 is a wiring diagram of the electrical system used with the measuring device of FIG. 1.

Referring now more particularly to FIGS. 1 and 2, the apparatus for introducing accurately measured doses of liquid comprises the measuring device 1, a liquid piping system 2, an air control and pressure delivery system 3 and an electrical system 4.

The measuring device 1 comprises a cylinder 10 which is preferably arranged vertically with an air passage 11 near the upper end of the cylinder, a bottom end plate 12 provided with a liquid passage 14 and a top end plate 16. The end plates are secured in any convenient way to the walls of the cylinder in fluid-tight relationship. A piston 18 is positioned in the cylinder 10 for reciprocation therein and a groove in its periphery is provided for an O-ring 20 which seals the space between the cylinder and piston so as to make the piston fluid-tight in relation to the cylinder wall. The piston rod 22 is secured to the face of the piston opposite the liquid passage 14 and it extends through an opening 24 in the top end plate 16 which is provided with a groove to receive an O-ring 26 so it can make a fluid-tight slidable joint between the piston rod and the top end plate. On the end of the piston rod which extends out through the opening a permanent magnet 28 is mounted for a purpose to be described.

Mounted on the top end plate 16 are four rods 30 which are arranged in pairs on a diameter through the piston rod as seen more particularly in FIG. 8. The upper ends of the guide rods or rails are secured to a top connector plate 32.

Several magnetically actuated switches are secured at various heights to these guide rails 30. One of these is a fill control switch 33 which is located near the bottom of one of the guide rails in the vicinity of the magnet 28 when it is in its lowermost position. An overfill limit control switch 34 is secured to one of the guide rails adjacent to the position of the magnet 28 in its uppermost position. Switches 35, 36 and 37 are secured to one of the guide rails at three different levels between switches 33 and 34. These are calibration control switches which may be adjusted to different heights to provide doses of the liquid to be measured of several predetermined different sizes.

Referring now to FIG. 9, each of the switches may comprise a glass envelope 38 which is securely held by a strong spring clamp 39 to an adjustable slider plate 40 by means of screws 41 which can be loosened to move the slider plate and tightened to hold it firmly in a selected position. At the bottom of the glass envelope is a pool of mercury 42 which, by reason of the high surface tension of mercury, tends to assume the shape of a ball. A lead wire 43 passes through the envelope of the switch and connects to a fixed contact 44 which has an end in contact with a mercury 42. A second lead wire 45 passes through the envelope and makes connection with the spring 46 having a movable contact 47 which, in the form shown in FIG. 9, is normally out of contact with the mercury so that the connection between leads 43 and 45 is normally broken. Secured to the end of the spring 46 is a magnetic bar 48 which, when the magnet 28 is nearby, pulls the spring arm into the pool of mercury and closes the connection between leads 43 and 45. In switches which are normally closed instead or normally opened, the spring arm instead of being normally out of the pool of mercury is normally in the pool of mercury and the metal plate 48, when attracted by the magnet, pulls the spring arm out of the mercury and breaks the contact. The upper end of the envelope of the switch is formed by a metal seal cap 49 which has gas-tight contact with the glass envelope.

The liquid supply system 2 comprises a liquid supply line 50 from a supply tank which is not particularly illustrated in FIG. 1, but may take the form of a supply tank similar to the one described later in connection with FIG. 5 which gives a sufficient hydraulic head to cause the liquid to flow without any mechanical device or it may be a supply tank having a motor-driven pump for supplying the liquid under the pump induced pressure, somewhat as described in greater detail in connection with FIG. 3. In any event, the supply line 50 is provided with a valve 52 to control the liquid feed from the supply tank into the chamber in cylinder 10. A convenient type of valve to use for this purpose is a diaphragm valve which is controlled by a three-way solenoid feed control valve 54 connected with a pressure air branch line 56. The three-way valve can be turned so as to either vent to the atmosphere through vent line 58 or connect to the diaphragm valve by a connecting line 60. A solenoid 62 is provided on the stem of the valve 54 to control the movable part and align the valve either with the vent line or the diaphragm valve connecting line. Valve 52 connects the liquid supply line with a liquid feed line 64 and a liquid feed and discharge line 66 through an X-connector 68. The lower arm of the X-connector 68 is connected to a calibration and maintenance line 70 which is normally closed by a plug 72. The remaining arm of the X-connector has a pipe 74 connected to it which serves as a liquid discharge line and the flow of liquid through it is controlled by a valve 76, also conveniently of the diaphragm type which is controlled by another three-way valve 80 similar to the valve 54 and which receives air from a pressure air branch line 82 connected to the main air pressure line 84 to which the branch line 56 is also connected as shown in FIG. 1. Valve 80 is connected, on the arm opposite the connection with the branch arm 82 to a diaphragm valve control line 86 and also to a cylinder connecting line 87 which is connected to the air passage 11 previously described. A solenoid 88 controls the movement of the movable element in the three-way valve so as to connect 86 and 87 either with the branch line 82 or a vent line 89.

Before describing the electric control system 4 in detail, the operation of filling the apparatus of FIG. 1 with liquid and then delivering it will first be described.

With the three-way valve 80 turned so that 86 and 87 are connected with the vent line 89 and with the diaphragm valve 76 closed, solenoid valve 54 is actuated to connect liquid supply line 50 with liquid feed line 64. This permits the liquid to displace the piston 18 upwardly, venting the air above the piston through air passage 11, the cylinder connecting line 87 and the vent 89. The cylinder continues to rise until the magnet 28 reaches the calibration control switch which has previously been selected to predetermine the volume of the dose of liquid to be delivered. This switch, when actuated by the magnet 28, breaks the circuit to the solenoid 62 and causes valve 52 to close. The dose of predetermined size can then remain in the cylinder 10 until the time comes for its delivery into a vessel schematically indicated in FIG. 1 by the letter V in which the product is being manufactured that requires a dose of liquid. The delivery is brought about by activating solenoid valve 80 which permits the air from line 82 to pass into the upper part of the cylinder above the piston by connecting line 87 and air passage 11 and at the same time the diaphragm valve 76 is opened to permit the delivery of the liquid through liquid passage 14, line 66, 74 and 78 into the vessel V. The piston 18 is thus forced downwardly by superatmospheric pressure of the air flowing through lines 82, 87 and 11 until valve 80 disconnects the pressure air and connects line 87 with vent line 89. The apparatus is thus restored to the initial condition which was assumed at the start of the description of the operation of this apparatus.

Referring now to the electrical system 4 shown in FIG. 2, two leads 90 from an electrical supply line bring current at suitable voltage into the electrical system. A normal 115 volt, 60 cycle alternating current supply line is quite satisfactory for the apparatus, but is not in any sense essential since any suitable alternating or direct current voltage can be used as those skilled in the art will appreciate. Five circuits 92, 94, 96, 98 and 100 are connected in parrallel across the electric supply line 90.

Circuit 92 includes a normally open fill control switch 33; a selector switch 102 which is selectively movable to contact 104 for normally closed switch 35, or to contact 106 for normally closed switch 36, or to contact 108 for normally closed switch 37 or to any other similar contacts for as many other similar switches as may be desired and which are represented collectively by contact 110 and normally closed switch 112; and the coil 114 of relay R-I having two normally open contacts 118 and 120 in circuits 94 and 96, respectively, and one normally closed contact 122 in circuit 100.

In circuit 94, there is also a bridge tie 124 between the fixed contact of selector switch 102 and the common terminals of normally open switch 108 and normally closed switch 34. Also in circuit 94 is the coil 126 of solenoid valve 62.

In circuit 96, there is also a filling light 130.

In circuit 98, there is a normally open switch 135 under control of relay R-2, soon to be described, and a discharge light 140 in parallel with the coil 142 of solenoid valve 80.

In circuit 100, in addition to the normally closed switch 122 of relay R-I is the coil 132 of relay R-2 which has a normally open switch 134 in series with it. As stated above, relay R-2 controls the closing of switch 135 when its coil 132 is activated. In parallel around normally open switch 134 is a normally open switch 138 which can be manually or automatically closed to cause the doses to be delivered even though the switch 134 is open. When 138 is closed, the circuit is established through the coil 132 which then closes switch 134 and holds this circuit closed even when manual pressure is taken off starting switch 138. In parallel with switches 134 and coil 132 is another line including a full light 139 and a normally closed switch 136 which is also controlled by relay R-2. Thus, during the filling operation light 139 is extinguished because R-2 is activated and opens normally closed switch 136 but, when the cylinder is filled to the predetermined level, relay R-2 is inactivated by the opening of one of the selected switches when the magnet reaches that height and this causes switch 122 to open and interrupt the flow of current through circuit 100.

This sequence of operations will now be described in conjunction with FIG. 2. Let it be assumed that switch 35 has been selected by placing the movable selector arm 102 on contact 104 as shown in FIG. 2 and that the delivery operation described above is practically complete. When magnet 28 comes into operating range of switch 33, it will be closed and cause current to flow through coil 114 of relay R-I. This closes switch 118 and establishes the flow of current through circuit 94 and also, by way of line 124, through the selected switch 35 and coil 114 so that relay R-I is activated even though switch 33 is opened when the magnet is moved away from this switch. At the same time, switch 120 in circuit 96 is closed to cause the filling lamp 130 to glow. At the same time, switch 122 is opened which extinguishes the full light 139 and inactivates the discharge circuit 100. The flow of current through circuit 94 activates coil 126 which causes solenoid 62 to apply air pressure to the diaphragm valve 52 and open it. Liquid now flows from the supply line 50 through lines 64, 66 and opening 14 into cylinder 10 and fills it until the magnet reaches switch 35 which then opens and breaks the circuit through relay R-I. This opens circuit 94, causing solenoid valve 54 to relieve the air pressure and close the diaphragm valve 52, thus stopping the flow of liquid from the supply line. It also opens circuit 96 and extinguishes the filling lamp 130, but closes switch 122 and establishes the circuit through full light 139. The system is now conditioned for discharge, but this will not take place until switch 138 is either manually or automatically operated.

Upon closing switch 138, current flow is established through circuit 100 to activate relay R-2 which opens the circuit through 139 and thus extinguishes the full lamp. It also closes switch 134 to keep current flowing through coil 132 relay R-2 until switch 122 is opened. Relay R-2 simultaneously closes valve 135 in circuit 98 which causes the discharge lamp 140 to glow and activates solenoid switch 88 by the influence of current flowing through coil 142 thereof. This causes air to flow from branch line 82 into lines 86 and 87 to apply the positive discharge or delivery pressure on piston 18 to activate the diaphragm valve 76 causing it to open and permit the discharge of the liquid under the positive delivery pressure through outlet 14 line 66, 74 and 78 into the vessel V. The discharge continues until the magnet 28 reaches the vicinity of switch 33 and closes it to initiate the aforedescribed filling operation.

As mentioned above, where the liquid to be introduced in predetermined doses into a product in the process of manufacture is a slurry of solids in a liquid which may, on standing, separate out as a deposit, it is advantageous to flush out the apparatus with water to prevent a build-up of solids which would interfere with the operation. A suitable apparatus for carrying out the water flush operation is illustrated in FIG. 3 in which the measuring part of the apparatus is the same as FIG. 1 and corresponding parts are given the same reference numeral with the postscript a. The means for supplying the water flush includes a T 150 in pipe line 64a which is connected to a water inlet pipe 152 having a solenoid valve 154 therein to control the flow of water into line 64a. The operation of this flush system will be described later in connection with the operation of the system of FIG. 3.

Means are provided in the liquid supply line 50a to recirculate the liquid and thereby keep it thoroughly agitated before delivery into the liquid feed line 64a. This means includes a recirculating line 156 from valve 52a which, in this embodiment of the ivention, is a three-way valve. In one position, it connects feed line 50a with recirculating pipe 156 leading to a recirculating tank 158 which has an outlet pipe 160 which is also the inlet pipe to a pump 162, which may be any suitable type of pump but satisfactorily may be a centrifugal pump, as illustrated, having an outlet pipe 164 connected by a T 166 in supply line 50a. It will be seen that when valve 52a is so turned as to connect 50a with 156 the liquid in the supply tank 158 will be recirculated from outlet line 160 through pump 162, line 164, T 166, valve 52a, line 156 into tank 158 and finally back into outlet 160. Line 50a is connected to a larger source of supply (not illustrated) and is either under sufficient pressure that there is no return flow during recirculation, as described, or, if desired, a valve (not shown) may be supplied in this line in advance of T 166 that would be opened to replenish tank 158 as needed.

In carrying out the process of the invention it is sometimes desired to deliver the dose of liquid to a selected vessel from a plurality of vessels used in the manufacture of the product which it is desired to dose with a predetermined quantity of liquid.

The delivery system in the embodiment shown in FIG. 3 is adapted for carrying out this method and differs from that shown in FIG. 1 in that a plurality of vessels is provided into which the measured quantity of liquid may be delivered. This system is highly advantageous in many chemical manufacturing plants where the mixing is done batchwise but some other operation is performed contiuously. For example, in the detergent industry, it is common to mix the ingredients for a spray-dried product in batch crutchers and discharge the batch crutcher mix into a surge tank from which the product is continuously withdrawn for the spray drying operation. In this operation, it is customary to use the two crutchers alternately, i.e., one of them is preparing a batch while the other is discharging its batch into the surge tank and vice versa. The embodiment shown in FIG. 3 is particularly adapted for this operation and thus illustrates two vessels V-I and V-a which represent the two crutchers, each of which has to be dosed with a predetermined selected quantity of some ingredient, e.g., an optical bleach, during one stage of the mixing operation. The delivery system comprises a crutcher selected solenoid valve 168 which is a three-way valve having a normal position which connects delivery line 74a with delivery line 74a-2, but when this solenoid valve is actuated, the three-way valve is turned so as to connect 74a with delivery line 74a-1. Delivery line 74a-1 has a solenoid valve 76a-1 in it to control the flow from it to a delivery line 78a-1 leading to vessel or crutcher V-I. In delivery line 74a-2, there is a similar valve 76a-2, preferably of the solenoid type, to control flow of liquid from 74a-2 through a delivery line 78a-2 connecting with crutcher or vessel V-2.

Referring now to FIG. 4, an electric supply line 200, similar to line 90 of FIG. 2, brings current at suitable voltage to five parallel circuits across line 200 which are identified as 202, 204, 206, 208 and 210.

In circuit 202 are a normally closed switch 212, under control of the relay R-5 soon to be described, a normally closed switch 214 under control of relay R-2, a normally open switch 216 under control of relay R-1 and the coil 218 of relay R-1. In parallel across normally open switch 214 is a normally open manual switch 220 which, when closed, establishes the flow of current through the branch of circuit 202 designated as 202-1, which activates relay R-1. R-1 when activated closes switch 216 so that the flow of current through line 202-1 continues even when manual pressure on switch 220 is released. The closing of this circuit initiates the delivery cycle through line 74a-1 into vessel V-1 as will be described more fully hereinafter.

Circuit 202 has a second branch 202-2 which takes off from the common terminal of switches 212 and 214 and includes a normally closed switch 222 under control of relay R-1, a normally open switch 224 under control of relay R-2, and the coil 226 of relay R-2. In parallel around normally open switch 224 is a manual control switch 228 which, when closed, completes the circuit to activate coil 226 and cause switch 224 to close so that current flows through circuit 202-2 even when the pressure on 228 is released. At the same time that switch 224 is closed switch 214 is opened to inactivate circuit 202-1. Similarly, when R-1 is activated switch 222 is opened to inactivate circuit 202-2.

Circuit 202-2 controls delivery through line 74a-2 into vessel V-2.

In circuit 204 is a normally open switch 230 under control of relay R-1. Its right terminal connects to two separate circuits marked 204-1 and 204-2. In circuit 204-1 are a normally closed switch 232 under control of relay R-2 and the coil 234 of solenoid valve 168. When current flows through coil 234, valve 168 is turned so as to connect line 74a with line 74a-1 and break the normal connection from 74a to 74a-2. In circuit 204-2 are a normally closed switch 236 under control of relay R-3 and a coil 238 of solenoid valve 76a-1. It will be understood that when relay R-1 is activated switch 230 will close and cause current to flow through both lines 204-1 and 204-2 and thus open all of the valves necessary for discharge of the liquid in the cylinder into crutcher V-1.

In circuit 206 is a normally open switch 240 under control of relay R-2, a normally closed switch 242 under control of relay R-3 and the coil 244 of solenoid valve 76a-2. It will be apparent that when relay R-2 is activated, solenoid valve 168 will be in its normal position connecting line 74a with line 74a-2 but closing the connection between 74 and 74a-1 and that current will also then flow through circuit 206 to activate and open solenoid valve 76a-2 so that delivery can be effected from cylinder 10a into crutcher V-2.

In circuit 208 are a normally closed switch 34a which is the overfill limit control switch in this embodiment of the invention and a normally closed switch 36a which can be adjusted to provide a predetermined volume of liquid in cylinder 10a by the time it is opened by magnet 28a. Also in circuit 208 is a switch 246 which is under control of relay R-3 and these are in series with coil 248 of relay R-3. In parallel across switch 246 are a normally open manual control switch 250 and a normally open switch 33a. It will be seen that when either 33a or 250 is closed current will flow through circuit 208 to activate relay R-3 and cause switch 246 to close and remain closed even when switch 250 is opened by removal of the manual pressure or when switch 33a is opened by movement of magnet 28a away from it.

Circuit 210 contains a normally open switch 252 under control of relay R-3. The right terminal of switch 252 has a common connection to line 200 through coil 254 of a time delay relay which may be set, for example, to operate after a delay of one second and coil 258 of a relay R-4. Also connected to the right terminal of switch 252 is a switch 256 which is normally open and is closed by time delay relay 254 after the elapse of the time period for which it is set to operate. Relay R-4 is a two step relay which closes a switch 260 at the same time that it opens a switch 262 and vice versa. Both of these switches have their left terminal connected with the right terminal of switch 256. The right terminal of switch 260 is connected to power line 200 through coil 266 of relay R-5 and coil 268 of solenoid valve 52a which holds line 64a open when energized, but closes it and opens line 156 when it is deenergized. The right terminal of switch 262 is connected to line 200 through coil 270 of solenoid valve 154 to control flow of water when 262 closes to establish flow of current through this branch of circuit 210.

The operation of the device in FIGS. 3 and 4, after a water flush, is begun by pressing manual starter switch 250 or automatically by magnet 28a closing switch 33a. This causes current to flow through the coil 248 of relay R-3 causing normally open switch 246 to close and maintain the flow of current through coil 248 when switch 33a or 250 is opened. At the same time, switch 252 is closed causing current to flow through coil 258 of relay R-4 to open switch 262 and close switch 260 and through coil 254 to condition switch 256 for closing after a short time delay, e.g., 1 second. When switch 256 closes current flows through the coil 266 of relay R-4 and through coil 268 to close the passage in valve 52a normally aligned with recirculating pipe 156 while aligning the passage in valve 52a with return line 164 from tank 158 and line 64a to fill cylinder 109 with the agitated slurry under the pressure from pump 162. Energizing of coil 266 of relay R-5 opens normally closed switch 212 to inactivate the delivery circuit 202. Liquid now flows through liquid feed lines 52a, 64a and 66a into cylinder 10a where it lifts piston 18a until magnet 28a reaches switch 36a or, in case switch 36a fails to operate, overfill limit control switch 34a. These are both normally closed switches so that the magnet 28a causes them to open when it comes close to them. When switch 36a or 34a is opened, R-3 is inactivated which opens switch 252 so that current ceases to flow through coil 266, which inactivates relay R-5 and closes switch 212 in circuit 202 to condition the delivery circuit for discharge when switch 220 or 228 is closed. Current also ceases to flow through coil 268 which permits valve 52a to close the passage from feed line 50a to feed line 64a and open the passage from feed line 50a to recycle line 156 to make up the volume of liquid in tank 158 and keep it agitated by recycling.

The delivery is initiated by closing manual switch 220 or 228.

When switch 220 is closed, current flows through coil 218 of relay R-1 which closes switch 216 to maintain the current flow thus established when switch 220 opens as it does when manual pressure ceases. At the same time, switch 222 opens to inactivate delivery circuit 202-2 and switch 230 closes which energizes coil 234 to turn selector valve 168 so that the passage in it connects delivery lines 74a and 74a-1. Also, coil 238 is energized to open valve 76a-1 to connect delivery line 74a-1 with 78a-1.

A solenoid valve in line 87a (not shown) is actuated at the same time that valves 168 and 76a-1 are thus opened so that air pressure is built up in cylinder 10a to force piston 18a downwardly and discharge the liquid in cylinder 10a under the piston through lines 74a, 74a-1 and 78a-1 into the first mixer V-1. When magnet 28a reaches the level adjacent to switch 33a it closes it, which reestablishes the current through circuit 208 and again actuates relay R-3 and the solenoid valve in line 87a closes the air line and vents the cylinder.

When R-3 is activated, it closes switch 252 which has the same effect described above except that this time switch 260 is opened and switch 262 is closed. This keeps relay R-5 inactive and causes current to flow, after time delay switch 256 closes, through coil 270 of solenoid valve 154 to open it and fill the system with water to the level previously filled with the liquid just delivered into the mixer. When the filling is completed, manual switch 220 is pressed again to force out the water as described above for the liquid and thus complete the washing cycle. This brings magnet 28a again to a position to close 33a and again activate circuit 208.

Now when circuit 208 is activated, relay R-3 closes switch 252 in circuit 210 which causes relay R-4 to close switch 260 and open switch 262 so that the filling of cylinder 10a with liquid from tank 158 takes place as described above and prepares the system for delivery by manually closing switch 220 or 228. If 220 is closed, delivery takes place as described. If 228 is closed, the following actions take place.

Current flows through coil 226 of relay R-2 causing switch 224 to close to maintain current flow when switch 228 opens as it does when manual pressure ceases. At the same time, switch 214 opens to inactivate circuit 202-1, and switch 240 closes to cause current to flow through circuit 206. This activates coil 244 to open valve 76a-2. With the breaking of the flow of current through relay R-1, as previously described, solenoid valve 168 has returned to its normal position in which the passage through it connects line 74a with line 74a-2. At the time valve 76a-2 is opened, a solenoid valve (not shown) in line 87a is actuated to apply pressure above piston 18a and deliver the liquid to a second mixer V-2 through line 78a-2. When magnet 28a closes switch 33a, the washing cycle is repeated as described above except that the wash water is discharged this time into the second mixer V-2.

The method of applying the superatmospheric pressure to displace the measured dose of liquid is not dependent upon the pressure generating system disclosed in FIG. 1 and an alternative is illustrated in FIG. 5 which utilizes a second driving cylinder 10c arranged in tandem with cylinder 10b. All other parts in FIG. 5 common to FIG. 1 are given the same reference characters as FIG. 1 with the addition of the postscript b. Cylinder 10b is provided with a vent line 11c to permit free flow of air to and from the upper part of cylinder 10b above the piston 18b. In cylinder 10c is a piston 18c making fluid-tight contact with the walls by an O-ring 20c similar to the O-ring 20b in piston 18b. The common piston rod 22b is fixedly attached to both of the pistons and extends through the top closure plate 16c of cylinder 10c. Plate 16c is provided with an opening 24c for passage of the piston rod 22b and it is provided with a groove and O-ring 26c to make fluid-tight but slidable connection between the closure plate 16c and the piston rod 22b. A magnet 28b is secured to the upper end of piston rod 22b and operates in conjunction with the switches 33b, 34b, 35b, 36b and 37b as already described for FIG. 1.

Valve 80b operates in the same way described for valve 80 in FIG. 1, with the difference that the cylinder connecting line 87b communicates with the upper part of cylinder 10c instead of the upper part of cylinder 10b so that the air pressure exerts its force directly on piston 18c instead of piston 18b, but since both of them are connected to piston rod 22b, it has the same ultimate effect of forcefully delivering the liquid from cylinder 10b into line 66b, 74b and 78b into the vessel V. An additional air line 87c is connected to the pressure air main line 84b, e.g., through line 56b and leads through a three-way valve 80c into cylinder 10c below the piston 18c. This three-way valve can vent the air below the cylinder as it is forced downwardly through vent line 89c or it can connect the main line 84b with the lower part of the cylinder to provide a positive lifting force for the pistons 18c and 18b. This positive lifting force creates a greater pressure differential between the pressure in the feed lines leading into the cylinder and, in some cases, may be desirable to facilitate flow where the pressure head may be somewhat inadequate because of high solids content of the slurry or the like. FIG. 5 shows a supply cylinder for the liquid to be measured and delivered which is represented by the designation S and it is at an elevation sufficiently higher than cylinder 10b to provide a pressure head adequate for causing most liquids to flow by gravity into pressure cylinder 10b and raise the piston without an assist from air pressure under the piston in cylinder 10c. At any time that an additional pressure differential is necessary this can be provided by the device in FIG. 5 by actuating valve 80c.

The device of FIG. 5 can be operated by the electrical system of FIG. 2 without modification except to provide a separate control, which may be a manual switch, for actuating solenoid 88c when it is desired to assist the inflow of thicker materials into the cylinder 10b on the filling cycle.

Figure 6:
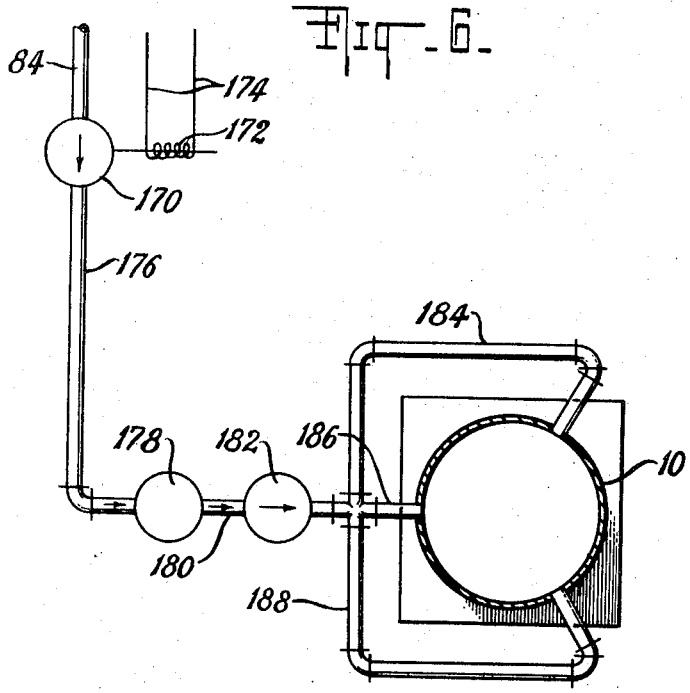
FIG. 6 is a schematic view of means for agitating liquid in the measuring cylinder.

As indicated above, when the liquid to be dosed is a slurry of solids suspended in a liquid which may settle out and form a deposit, it is advantageous where the measured quantity is held for a long enough time for any settling to take place, to agitate this measured dose. A suitable apparatus for carrying out this method is disclosed in FIG. 6 which comprises a valve 170 of the solenoid type connected to the pressure air line main 84. Valve 170 is operated by coil 172 having leads 174 connected to a suitable source of current through a switch or relay (not shown) to control the flow of current through the coil. Valve 170 is connected by an air line 176 to a pressure reduction valve 178 and the pressure reduction valve 178 in turn is connected by a pipe 180 to a check valve 182 for preventing back flow of materials into the air line 180. The check valve 180 in turn is connected to air headers 184, 186 and 188 which communicate at three points, preferably 120° apart, adjacent to the bottom of cylinder 10. By introducing air under pressure into the cylinder through these air headers at the time of delivery of the measured dose, the slurry is agitated sufficiently to keep any solids in suspension. This can easily be accomplished, e.g., by connecting the leads 174 in parallel or in series with the delivery light 140 or by providing a normally open switch or contact to be closed by relay R-2.

Figure 7:
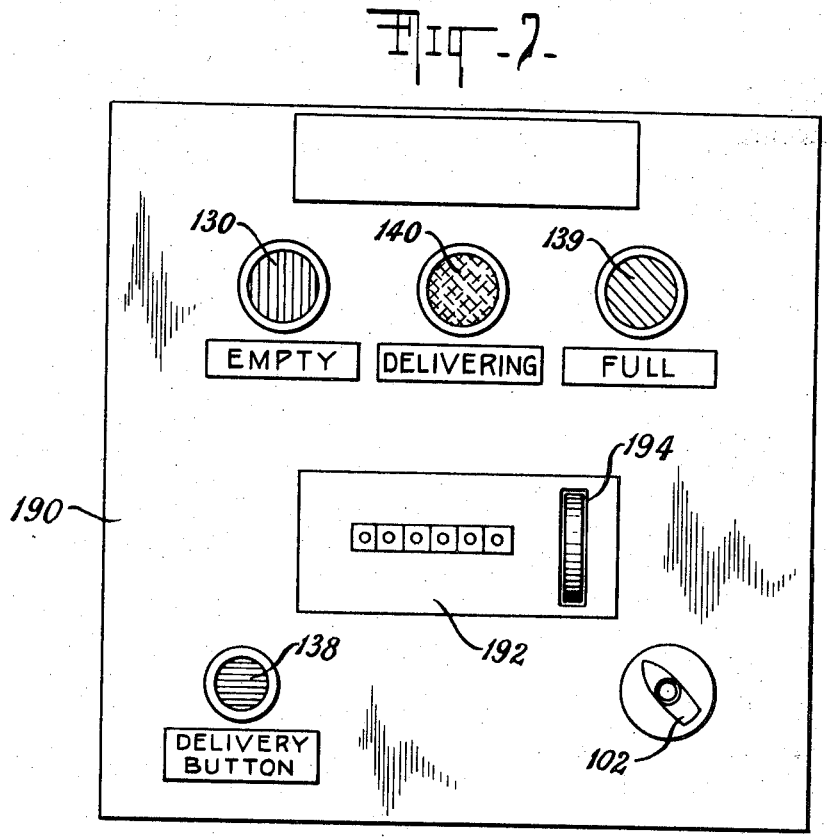
FIG. 7 is a front view of an instrument board for use with the apparatus of FIG. 1.

In actual practice of the method of the present invention in a factory, it is desirable to have the controls and lights used in connection with suitable apparatus monitored on an instrument panel where the operator is able to see what is happening and to manipulate the manual controls conveniently. In FIG. 7, such an instrument panel 190 is shown for the device of FIG. 1. As illustrated, the selector switch 102 is provided for selecting the particular switch which will govern the size of the dose which is measured. In the device of FIG. 2, delivery is initiated by manual switch 138 and a button for this switch is mounted on the instrument panel and identified by the legend "delivery button."

The three lights in the circuit of FIG. 2 are also mounted on the instrument panel adjacent to the legends "empty" for switch 130, "full" for switch 139, and "delivering" for switch 140. These lights may have different colors and they are hatched to illustrate how different colors may be used along with the printed insignia.

It is also desirable to include a counter 192 in the instrument panel to show the number of cycles through which the equipment has gone which is equivalent to the number of doses that have been delivered by the machine. The counter may be provided with a reset wheel 194 to restore the counter to zero after a given number of batches or the elapse of a given time, e.g., one shift, one day, or the like.

The invention has been described and illustrated in conjunction with a number of specific embodiments of suitable apparatus and circuits for controlling the operation thereof but those skilled in the art will recognize that many modifications and variations in the apparatus and the control circuit may be made and still perform the method in accordance with the principles of the invention as described and illustrated above and as set forth in the appended claims.

I claim:

1. The method of introducing doses of liquid into a product in process of being manufactured each dose being of predetermined volume electrically selected from a plurality of such volumes, which comprises forming each dose by flowing liquid into a measuring chamber to a level corresponding to an electrically predetermined volume and deliverig each dose of measured liquid to said product for incorporation therein.

2. The method of introducing doses of liquid, each of predetermined volume, into a product as set forth in claim 1 in which the liquid is a slurry of solid particles that will settle and settling is practically prevented by agitating the liquid before delivering it.

3. The method of introducing doses of liquid, each of predetermined volume into a product as set forth in claim 2 in which the slurry is agitated while it is held segregated.

4. The method of introducing predetermined doses of liquid into a product as set forth in claim 1 in which the liquid is a slurry and the delivery of each dose of liquid is followed by a water flush of the measuring chamber.

* * * * *